United States Patent
Quaal et al.

(10) Patent No.: US 9,320,115 B2
(45) Date of Patent: Apr. 19, 2016

(54) POWER CONTROL UNIT

(75) Inventors: Bruce Quaal, Ventura, CA (US); John Koteles, Oxnard, CA (US)

(73) Assignee: THE SLOAN COMPANY, INC., Ventura, CA (US)

( * ) Notice: Subject to any disclaimer, the term of this patent is extended or adjusted under 35 U.S.C. 154(b) by 665 days.

(21) Appl. No.: 13/308,377

(22) Filed: Nov. 30, 2011

(65) Prior Publication Data
US 2012/0299498 A1  Nov. 29, 2012

Related U.S. Application Data

(60) Provisional application No. 61/418,340, filed on Nov. 30, 2010.

(51) Int. Cl.
*H05B 37/02* (2006.01)
*H05B 33/08* (2006.01)

(52) U.S. Cl.
CPC ........ *H05B 37/0227* (2013.01); *H05B 33/0845* (2013.01)

(58) Field of Classification Search
CPC   F21Y 2101/02; H05B 37/02; H05B 33/0818; H05B 33/0857; H05B 33/0815
USPC .................................. 315/160, 210
See application file for complete search history.

(56) References Cited

U.S. PATENT DOCUMENTS

| | | | | |
|---|---|---|---|---|
| 4,933,606 A * | 6/1990 | Tary | ...................... | H05B 41/285 315/200 R |
| 4,965,492 A | 10/1990 | Boldwyn | | |
| 5,341,086 A * | 8/1994 | Fukudome | ................ | G05F 3/22 323/273 |
| 6,462,976 B1 * | 10/2002 | Olejniczak | .............. | H01L 23/48 257/E23.01 |
| 6,726,341 B2 | 4/2004 | Pashley et al. | | |
| 6,808,287 B2 * | 10/2004 | Lebens et al. | ................. | 362/184 |
| 7,181,924 B2 | 2/2007 | Duffy et al. | | |
| 7,237,925 B2 | 7/2007 | Mayer et al. | | |
| 7,825,726 B2 * | 11/2010 | Midya | ..................... | H03F 3/217 330/10 |
| 8,415,901 B2 * | 4/2013 | Recker | ............... | H05B 33/0803 315/172 |
| 8,829,799 B2 * | 9/2014 | Recker | ...................... | H02J 9/02 315/159 |
| 8,878,440 B2 * | 11/2014 | Reed | .................. | H05B 37/0218 315/130 |

(Continued)

FOREIGN PATENT DOCUMENTS

WO    WO2009/064049    5/2009

OTHER PUBLICATIONS

U.S. Appl. No. 13/049,766, filed Mar. 16, 2011, Quaal, et al.

(Continued)

*Primary Examiner* — Tung X Le
*Assistant Examiner* — Srinivas Sathiraju
(74) *Attorney, Agent, or Firm* — Koppel, Patrick, Heybl & Philpott

(57) ABSTRACT

The present invention generally provides a power control unit adapted to provide adjustable levels of a controlled output power signal, such as but not limited to a pulse width modulated signal or a serial binary signal. One embodiment of a power control unit according to the present invention comprises a housing holding internal electronic components. This housing further comprises input and output wiring extending out of the housing and internally connected to the electronic components. The electronic components further comprise circuitry capable of providing at least 2 levels of the controlled output power signal. The present invention also includes lighting systems incorporating a power control unit according to the invention.

21 Claims, 6 Drawing Sheets

(56) References Cited

U.S. PATENT DOCUMENTS

| | | | |
|---|---|---|---|
| 9,074,736 B2* | 7/2015 | Recker | F21K 9/13 |
| 9,078,313 B2* | 7/2015 | Recker | H05B 33/0815 |
| 2002/0113192 A1* | 8/2002 | Antila | 250/205 |
| 2003/0057888 A1* | 3/2003 | Archenhold et al. | 315/291 |
| 2005/0035729 A1* | 2/2005 | Lev et al. | 315/291 |
| 2005/0265019 A1 | 12/2005 | Sommers et al. | |
| 2007/0159820 A1 | 7/2007 | Crandell et al. | |
| 2009/0002990 A1 | 1/2009 | Becker et al. | |
| 2009/0021936 A1 | 1/2009 | Stimac et al. | |
| 2009/0058313 A1* | 3/2009 | Chang et al. | 315/276 |
| 2009/0085494 A1* | 4/2009 | Summerland | H05B 33/0857 315/291 |
| 2009/0224623 A1* | 9/2009 | Saito | B60K 6/448 310/156.53 |
| 2010/0109767 A1* | 5/2010 | Midya et al. | 330/10 |
| 2010/0117563 A1 | 5/2010 | Hani | |
| 2010/0237711 A1 | 9/2010 | Parsons | |
| 2010/0269383 A1* | 10/2010 | Nifenecker | 40/541 |
| 2011/0199068 A1* | 8/2011 | Rinaldi | H05B 39/041 323/311 |
| 2011/0312287 A1* | 12/2011 | Ramachandran | H04B 15/02 455/77 |
| 2012/0293153 A1* | 11/2012 | Garb | H02J 3/00 323/311 |

OTHER PUBLICATIONS

Raghavan, R. et al., "Refrigerated Display Case Lighting With LEDs", Lighting Research Center, Rensselaer Polytechnic Inst., Troy, NY, p. 1-9, http://www.lrc.rpi.edu/programs/solidstate/pdf/SPIE4776-13 Raghavan.pdf.

EfficientLights Products, 5' LED Refrigerated Display Light Specifications, EfficientLights International (2009).

Refrigerated Display Lighting, Lighting food, Brightening faces, Philips, p. 1-5 (2009) http://www.lighting.philips.com/us_en/applicationsolutions/led/re . . . .

Hussmann, Hussmann Introduces LED Lighting Solutions for Reach-Ins, Walk-Ins, Multi-Decks & Islands, p. 1-10 (2009), http://www.hussmann.com/Pages/LEDLighting.aspx.

Immersion LED Display Lighting, Retrigerated-Display, GE Lumination, p. 1-12.

Search Report and Written Opinion for corresponding PCT Application No. PCT/US2011/062709, dated Apr. 12, 2012.

* cited by examiner

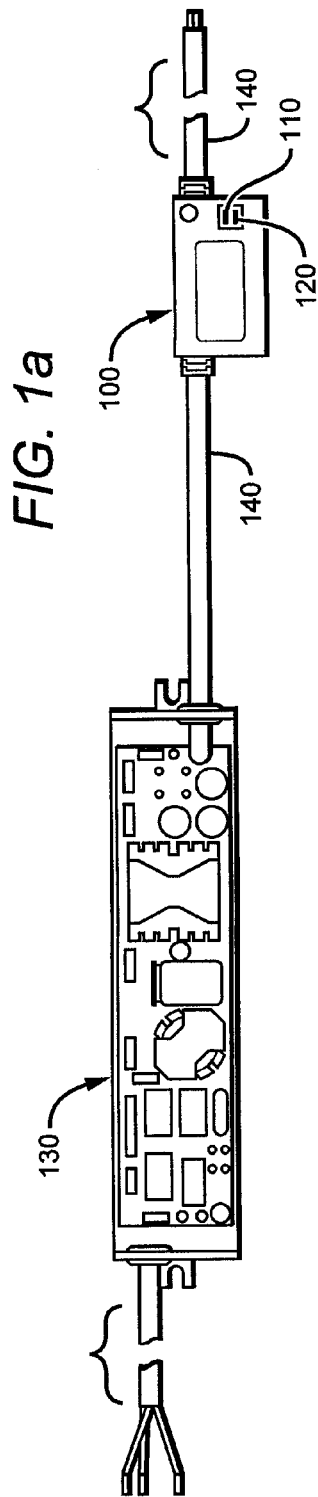
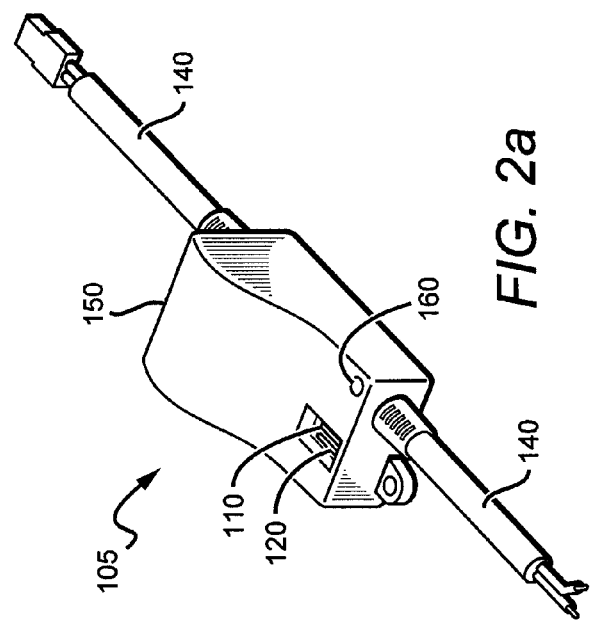
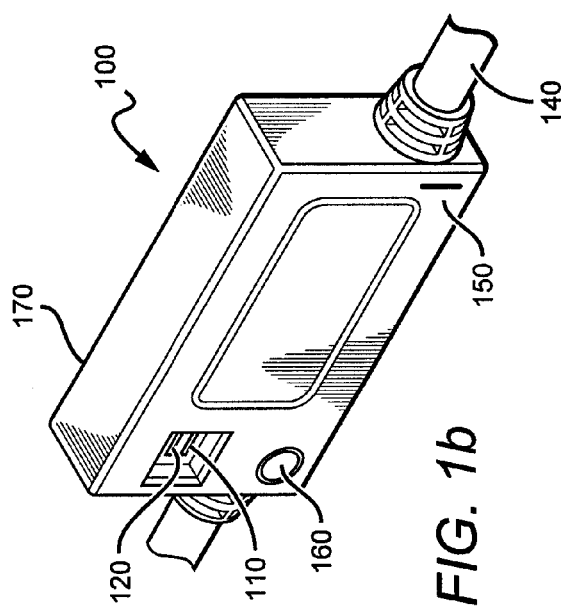
FIG. 1a
FIG. 2a
FIG. 1b

POWER CONTROL UNIT

RELATED APPLICATIONS

This application claims the benefit of priority of U.S. Provisional Application Ser. No. 61/418,340, filed on Nov. 30, 2010.

BACKGROUND OF THE INVENTION

1. Field of the Invention

This invention relates to lighting power control systems, more particularly to LED based lighting power control, and the control units for such systems.

2. Description of the Related Art

Display units, such as shelving units, refrigeration units, and freezer units, are commonly used in retail applications to display merchandise. To enhance the visibility of merchandise within these units, different types of lighting are incorporated. Various types of lighting systems are used with different light sources such as incandescent bulbs or fluorescent tubes. One of the problems associated with the conventional lighting units and systems is that their light sources can experience relatively short lifespans and they can have relatively low electrical efficiency. Incandescent bulbs and fluorescent tubes have a relatively short lifespan, particularly when compared to other light sources such as typical light emitting diodes. Also, heat produced by fluorescent lights inside cooled areas or display cases which are refrigerated place an additional load on the cooling or refrigeration systems. These light sources are also electrically inefficient and providing sufficient lighting, especially in large lighting applications, requires the consumption of significant energy. For example, a standard fluorescent tube 60 inches in length consumes as much as 60 to 70 watts, and conventional display units can utilize many of these tubes.

Alternative light sources have also been used in display units, including light emitting diodes. However, many of these designs result in only minimal energy saving, and often produce non-uniform lighting, secondary spotting or "glare" effects. Furthermore, the power supplies and power units associated with these systems do not allow for adjustable control of power consumption. That is, these conventional systems do not have a mechanism to allow power consumption to be adjusted based on current ambient conditions and light source applications.

SUMMARY OF THE INVENTION

The invention disclosed herein provides various embodiments of power control units for use with lighting systems. The different embodiments comprise various arrangements providing adjustable levels of power consumption and light output.

The invention, as embodied and broadly described herein, provides a power control unit particularly adapted for use with a lighting system to provide adjustable levels of pulse width modulated or serial binary signal controlled power output. One embodiment of the invention is directed to a power control unit for use with lighting systems, according to the present invention, and comprises a housing holding internal electronic components. The housing further comprises input and output wiring extending out of the housing and internally connected to the electronic components. The electronic components further comprise circuitry capable of providing at least 2 levels of a controlled output power signal, such as but not limited to a pulse width modulated signal or a serial binary signal.

In another embodiment, the invention comprises lighting systems using the power control unit. One embodiment of a lighting system with adjustable power consumption according to the present invention comprises at least one light emitting unit, a power supply, and a power control unit capable of providing at least 2 levels of a controlled output power signal, such as but not limited to a pulse width modulated signal or a serial binary signal.

These and other further features and advantages of the invention will be apparent to those skilled in the art from the following detailed description, taken together with the accompanying drawings.

BRIEF DESCRIPTION OF THE DRAWINGS

FIG. 1a is a perspective view of one embodiment of a power control unit according to the invention.

FIG. 1b is a perspective view of the power control unit shown in FIG. 1a.

FIG. 2a is a perspective view of another embodiment of a power control unit according to the invention.

FIG. 2b is another perspective view of the power control unit shown in FIG. 2a.

DETAILED DESCRIPTION OF THE INVENTION

Figure 2B:
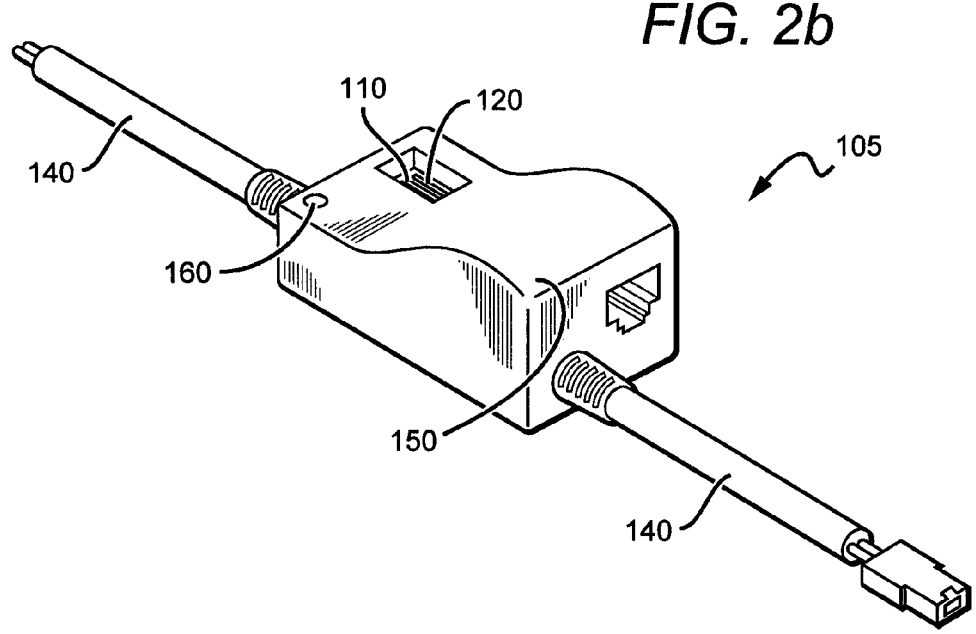

Embodiments of the invention disclosed herein provide a lighting system power control unit that can be used in many different lighting applications such as, but not limited to, display case lighting and refrigeration unit lighting. Examples of such lighting systems can be seen in U.S. patent application Ser. No. 13/049,766, to Quaal et al, entitled "Display Case Lighting," and incorporated herein by reference in its entirety. The power control units according to the present invention can be arranged in many different ways with many different components, and are generally arranged to control the power consumption and light intensity of lighting systems during different conditions.

Some embodiments of a power control unit according to the present invention can be used with display units, such as those used in retail sales applications. As further described below, the power control units can be arranged to allow the user to change the intensity of light emitted by the light sources in the display, such that the different emission intensities in the range of maximum power setting for maximum product illumination, to energy saving power setting with lower light output but adequate product illumination. The different embodiments can also have different settings between these two, or could have even lower power settings, such as off when the retail location is closed or when no customers are present. This arrangement allows for the display units light output to be customized to the particular retail environment at different times. For example, the power control units in the lighting systems for the display units can be set to produce maximum light output at times when the most customers are present. At slower times, and to reduce power consumption, the power control units can be set to produce a lower level of light output.

The power control units can be used with many different lighting systems having different light sources, with some embodiments being described with reference to lighting systems utilizing light emitting diodes as their light source. The different modes for the power control units can also be changed using many different mechanisms such as local mechanical switches at each power control unit, a master mechanical switch to control a plurality of power control units, electrical switches either local or master, or wirelessly controlled switching. The power control units according to the present invention can control the intensity of the light emitted by the light sources in many different ways, including but not limited to, by varying a pulse width modulated signal or serial binary signal sent to the light sources.

The invention is described herein with reference to certain embodiments but it is understood that the invention can be embodied in many different forms and should not be construed as limited to the embodiments set forth herein. In particular, the invention is described with reference to certain embodiments where the lighting power control unit includes two mechanical switches to control the power level and emission intensity of the light sources, but in other embodiments the power control unit can utilize other numbers of switches. In these embodiments, the power control unit can have different variations of power settings. Further, as mentioned above many different mechanisms and arrangements can be used to allow for different power settings to be chosen by use of the power control unit. In addition the lighting power control units may be constructed and sealed using a variety of materials. The sealing of the power control units allow for reliable operation in harsh environments such as cold or freezing conditions.

The different embodiment of the present invention can also be used in different types of lighting units used in different applications beyond display units. Some of these include refrigeration lighting, architectural lighting, room lighting and channel letter lighting, and although the invention is described herein with reference to light emitting diodes (LED or LEDs) other light sources can be used. Also, though the invention is described as power control units with switching mechanisms described above, different embodiments can also be used with many other devices or modules such as, occupancy sensors and dimming control modules. The occupancy sensors can be arranged to sense when a customer is present and can cause the power control unit to increase the emission intensity of the light sources to better display products. When the customer is not present, the power control unit can decrease the lighting intensity of the light sources to save power. Dimming control units can also be included with the power control unit to provide further control over the light source emission intensity.

It is to be understood that when an element or component is referred to as being "on" another element, it can be directly on the other element or intervening elements may also be present. Furthermore, relative terms such as "inner", "outer", "upper", "above", "lower", and "below", and similar terms, may be used herein to describe a relationship of one item to another. It is understood that these terms are intended to encompass different orientations of the device in addition to the orientation depicted in the figures.

Although the terms first, second, etc. may be used herein to describe various elements and/or components, these elements and/or components should not be limited by these terms. These terms are only used to distinguish one element or component from another. Thus, a first element or component discussed below could be termed a second element or component without departing from the teachings of the present invention.

Embodiments of the invention are described herein with reference to illustrations that are schematic illustrations of embodiments of the invention. As such, the actual thickness of the elements and features can be different, and variations from the shapes of the illustrations as a result, for example, of manufacturing techniques and/or tolerances are expected. Embodiments of the invention should not be construed as limited to the particular shapes of the elements illustrated herein but are to include deviations in shapes that result, for example, from manufacturing. An element illustrated or described as square or rectangular will typically have rounded or curved features due to normal manufacturing tolerances. Thus, the elements illustrated in the figures are schematic in nature and their shapes are not intended to illustrate the precise shape of a feature of a device and are not intended to limit the scope of the invention.

With reference to FIGS. 1a and 1b, an exemplary lighting power control unit 100 is shown. In some embodiments the lighting power control unit 100 can be connected to and used in conjunction with a power supply unit 130. Many different types of power supply unit 130 can be used with the power control unit 100 such as a 24 VDC/100 W power supply, but it is understood that it can be any power supply. In some embodiments the power control unit 100 can be enclosed on all sides and can includes a number of switches. In some embodiments the lighting power control unit 100 can comprise an over molded printed circuit board assembly (PCBA) with two exposed switches 110, 120. In some embodiments these switches can comprise a Dual In-Line Position (DIP) switch, but can be any other type of suitable switch or any number of switches. In embodiments with two switches 110, 120, the two switches can be arranged to dictate four different power settings, although they can be arranged for fewer power settings. In other embodiments, other combinations of switches can create different numbers of power settings. Each of the two switches 110, 120 has an on and off setting, and manipulating these settings provides the four different power settings.

One example of the use of these switches to provide four different power settings is as follows: switch 1 110 in the on position and switch 2 120 in the on position, providing 96% power transmission from the power supply to the connected lighting system; switch 1 110 in the off position and switch 2 120 in the on position, providing 80% power transmission from the power supply to the connected lighting system; switch 1 110 in the on position and switch 2 120 in the off position, providing 60% power transmission from the power supply to the connected lighting system; and lastly, switch 1 110 in the off position and switch 2 120 in the off position, providing 0% power transmission from the power supply to the connected lighting system. In other embodiments the combinations of switches and outputs determined by these combinations may be adjusted based on desired output levels.

The power control unit 100 can provide the output power transmission level by using a pulse width modulation signal or a serial binary signal.

The different power setting can correspond to different lighting intensity based on the conditions at the retail location. As mentioned above, the maximum power setting (e.g. 96% emission intensity) can correspond to the maximum power setting for premium product illumination. The next lower intensity setting (e.g. 80% emission intensity) can be for standard product illumination. The next lower intensity setting (e.g. 60% emission intensity) can be for an energy saving power setting which can provide still adequate product illumination. Finally, the lowest intensity setting (e.g. 0% emission intensity) can be for turning the lighting off when no customers are present or when the retail location is closed. The power control units can be used with occupancy sensors to automatically switch between the lowest intensity setting and any of the other intensity settings when customers are present.

Figure 3:
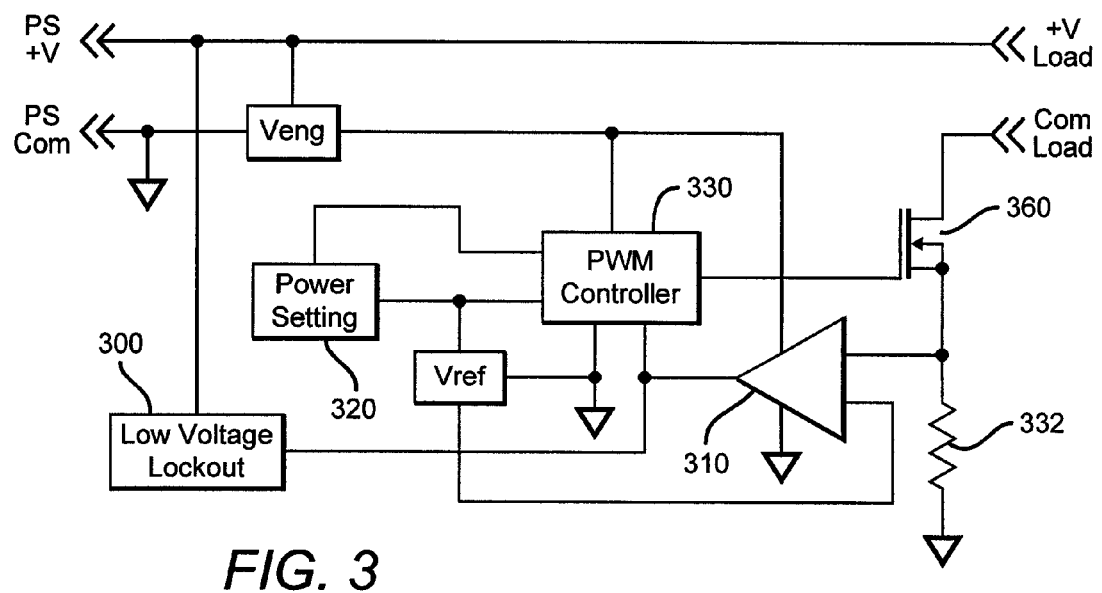
FIG. 3 is a block diagram of the circuitry of a power control unit according to an embodiment of the invention.
Figure 4:
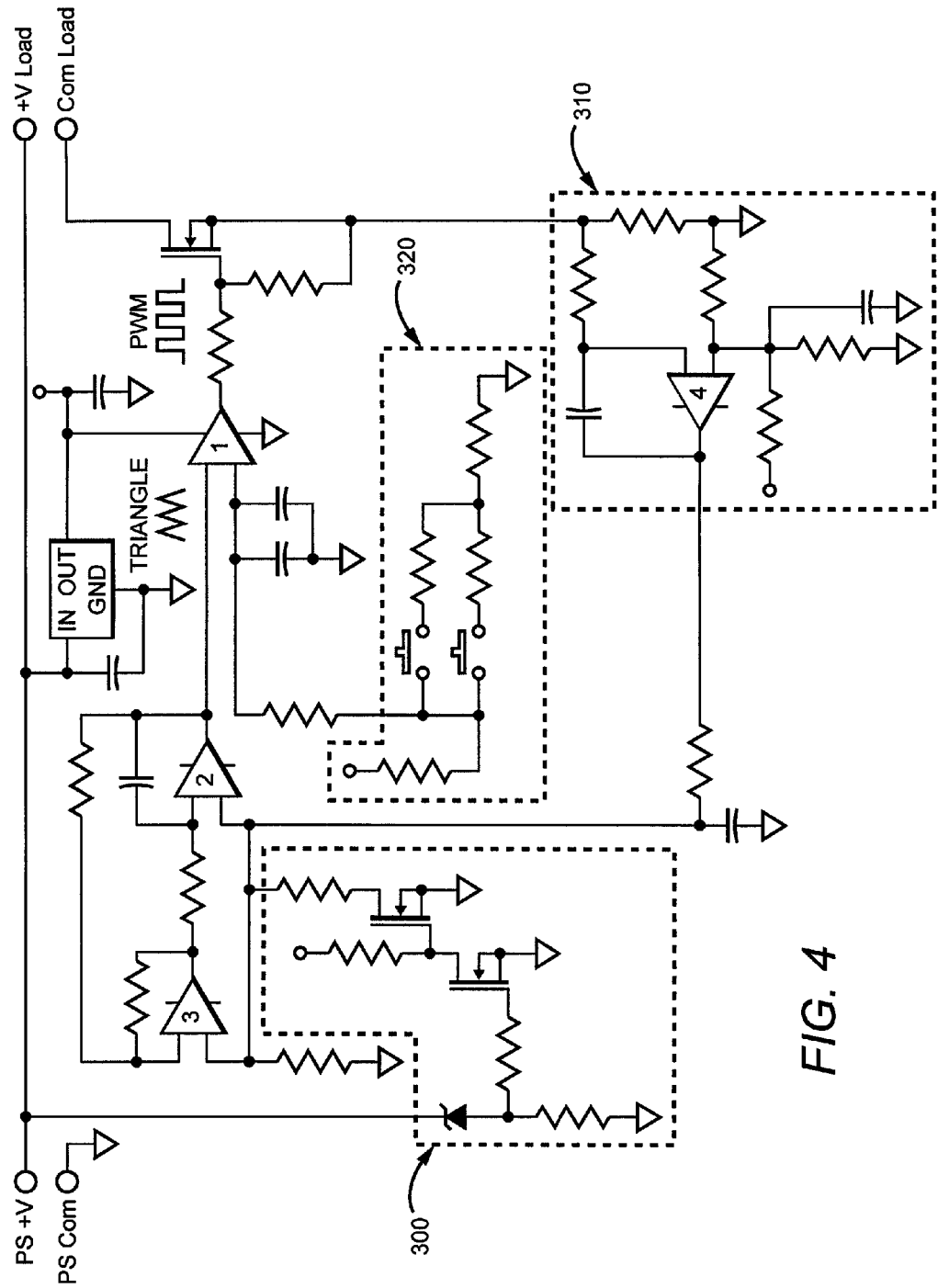
FIG. 4 is a schematic of a power control unit according to an embodiment of the invention.

Embodiments of the present invention provide adjustable power levels for lighting units that allow the user to easily adjust the emission intensity and power consumption of their lighting systems. FIGS. 3 and 4 show a block diagram and the discrete components, respectively, of one embodiment of a power control unit according to the present invention. Another advantage of the power control units according to the present invention is that the component counts, or number of discrete components, of the power control unit 100 can be relatively small. The power control unit 100 can be arranged with many components interconnected in many different ways, but in the embodiment shown is capable of operating with a same component part by using an analog circuit incorporating the use of a quad operational amplifier. The power control unit circuit can be made up of at least a low or undervoltage lockout circuit 300, a current limit circuit 310, and a power controller setting circuit 320. As best shown in FIG. 3, the power control unit 100 can utilize inputs from, a power switch 360, a pulse width modulation (PWM) or serial binary signal controller 330, a current limit circuit 310, a low or undervoltage lockout circuit 300, and a power settings circuit 320 to determine which output level the power control unit 100 will output.

The pulse width modulation or serial binary signal controller 330 is used to vary the total amount of power to a load; the average value of voltage and current to the load is controlled by the duty cycle which is the proportion of "on time" or "high" to the regular interval or period. In the case of a pulse width modulated signal, this is a portion of the cycle that remains high through the duty cycle. For serial binary signal, this is the total amount of time that the cycle is high based on the accumulation of the number of serial binary signals in the duty cycle. The duty cycle output is set by means of a reference voltage input. The power setting circuit 320 controls the maximum duty cycle or power output allowed; the actual settings are switch selectable via switch 1 110 and switch 2 120 and the range of settings can be adjusted per application. The current limit circuit 310 monitors the output load current via the sense resistor 332; the maximum load current allowed is set by a reference voltage which corresponds to a predetermined current limit threshold. Once the current limit threshold is exceeded, a feedback signal then limits the duty cycle output from the PWM controller or serial binary signal controller 330 which then limits the output load current to the maximum allowed setting. The low voltage lockout circuit 300 prevents controller operation when the input voltage is not in a safe operating threshold; a minimum input voltage is required for safe operation. This circuit is also known as an under voltage lockout circuit.

In embodiments which incorporate the use of a serial binary signal to control the output power transmission level, each switch can produce a binary coded decimal (BCD) output that is coupled to an input of the serial binary signal controller 330. Based on a BCD input received by the serial binary signal controller 330, an LED control signal comprising a series of binary signals is generated corresponding to the desired intensity.

The current through the LED is controlled using transistors. An output of the serial binary signal controller 330 is coupled to the base of each of LED(s) (not shown) and the serial binary signal controller 330 sends a serial binary signal to each of the transistors. Each serial binary signal comprises a series of bit words having high pulses, with each of the pulses having substantially the same width. Many different word lengths can be used, with a suitable length being 8-bit, 16-bit, 32-bit, etc. The serial binary signals can be of different lengths with different pulse widths to provide different light intensity outputs.

A high on the serial binary signal at the base of one of the transistor turns on the transistor and creates a ground path for its respective one of the LED(s). This allows current to flow through the LED such that the LED emits light. During a digital low on the serial binary signal, the particular one of the transistors is not on and current does not flow through its one of the LED(s).

Figure 2C:
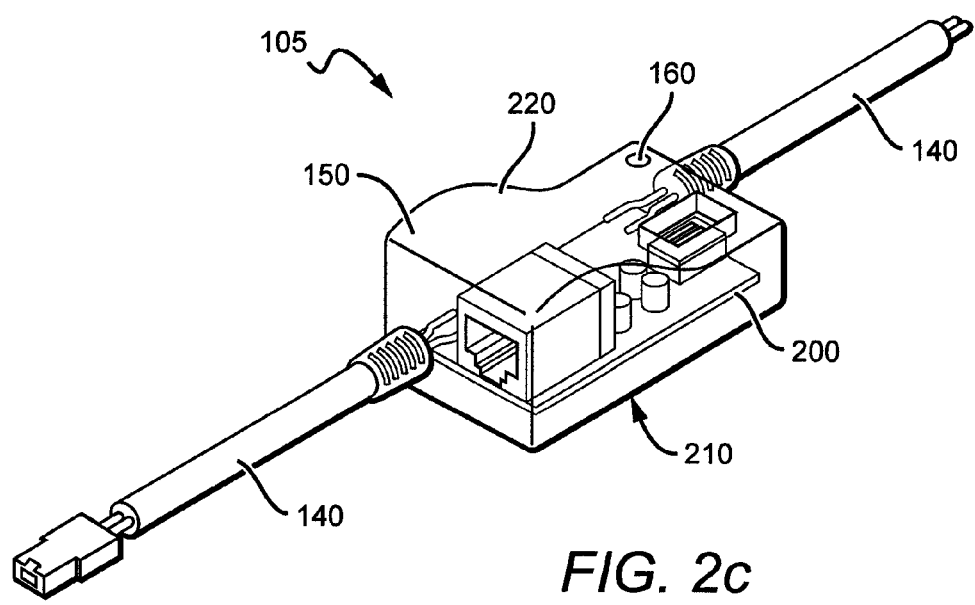
FIG. 2c is a perspective view of the power control unit in FIG. 2a where portions of the embodiment have reduced opacity to show other elements.
Figure 2D:
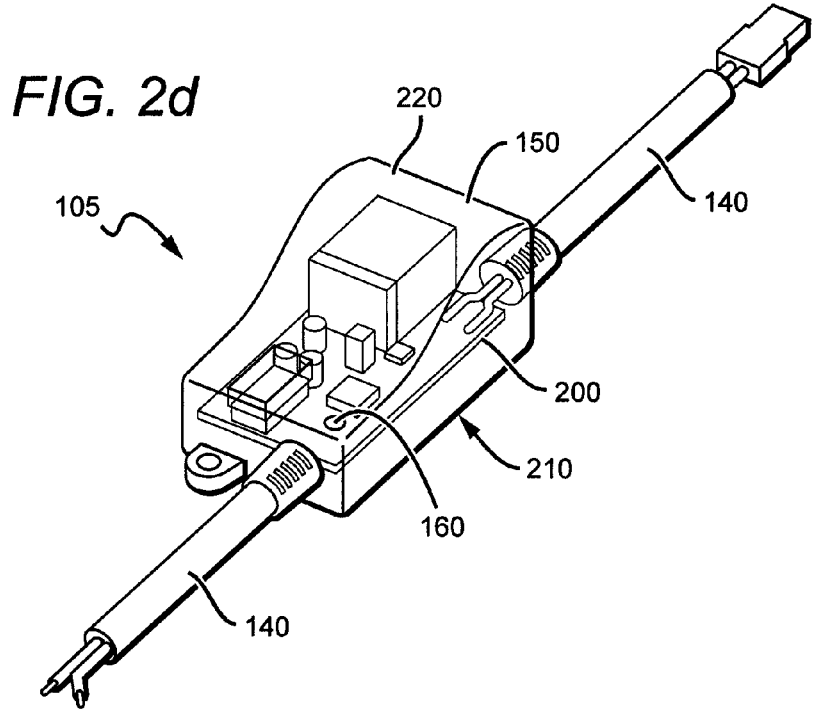
FIG. 2d is a perspective view of the power control unit in FIG. 2a where portions of the embodiment have reduced opacity to show other elements.

FIGS. 2a through 2d show another embodiment of the power control unit 105 shown from different angles. For the same or similar elements for features, the same reference numbers will be used from FIGS. 1a and 1b. Each power control unit 105 can comprise a printed circuit board (PCB) 200 mounted within a power control unit housing 220. The housing can comprise an overmolded portion 210 that the PCB 200 can be mounted within, as shown in FIGS. 2c and 2d. The overmolded portion 210 can be made of many conductive, semi-conductive and non-conductive materials. In an embodiment, the portion 210 can be made of plastic and can be made using many known processes such as by extrusion or injection molding.

The PCB 200 has components mounted or connected to the PCB. Many different connection methods can be used, with one suitable method being soldering. The PCB 200 can also comprise conductive traces to conduct electrical signals from these components. Additionally, conductive cabling 140 is electrically connected to the PCB 200. This cabling 140 runs outside of the power control unit 105, connecting it on the input side 150 to the power supply 130 and an output connection side 160 to the lighting system or other in-line devices between the power control unit 105 and the lighting system. In other embodiments the power control units can comprise more or less components that can be mounted in many different locations.

The PCB 200 can be any conventional type made from any conventional material, such as but not limited to a metal core type PCB. Different types of metal core boards can be used such as an aluminum core board. By being a metal core, heat from the components conducts into the PCB 200 so that the PCB 200 helps draw away heat from the components. The PCB 200 then provides a larger surface that allows the heat to dissipate into the surrounding ambient. This can help keep the power control unit cooler, which can allow them to operate under a higher current.

Power control units according to the present invention can also comprise other elements, with one embodiment comprising constant current devices that can be mounted on the PCB using conventional methods. This allows each of the units to have substantially the same current driving its light elements so that each of lighting unit emits substantially the same amount of light. Without a constant current device, the system can experience light loss as the power signal passes down the conductive cabling 140 through each of the units. This can ultimately result in a lighting unit exhibiting different brightness. By driving each of the light elements in each of the units with the same current, the light elements along the conductor will have the same brightness. Many different constant current devices can be used, with a suitable device being an LM317M 3-Terminal Adjustable Regulator provided by Texas Instruments, National Semiconductor, and Fairchild Semiconductor.

During fabrication of some power supply units according to the present invention, a PCB 200 can be held in place by an injection mold tool (not shown). Next a low pressure overmolding system is used and the area surrounding the PCB 200 is filled with a sealant, which bonds to the PCB, and any other component the sealant contacts. In some embodiments, this sealant or overmold may be a thermoplastic hotmelt. One suitable thermoplastic hotmelt is Macromelt© manufactured by Henkel AG & Co, another is Thermelt 869W.

In other embodiments a high pressure overmolding or an overmolding with a plastic housing could be utilized, but a low pressure overmolding system utilizing a thermoplastic hotmelt can also be used since other systems can damage the PCB and related components during application of the molding or housing.

Each power control units 100 and 105 described above can be mounted by many different methods such as but not limited to glue, clamp, bolt, weld, etc. Power control unit 100 can be provided with double sided tape on its bottom surface 170 for mounting. Many different double sided tapes can be used, such as commercially available double sided foam tape provided by 3M Corporation. The power control units 100 and 105 can also be provided with an alternative mounting method that can be used alone or in conjunction with the double sided tape. The overmolded portion 210 can include a mounting hole (not shown) through which a screw, nail or rivet can pass to mount the overmolded portion 210. The PCB 200 can also comprise a PCB mounting hole (not shown) in alignment with the housing mounting hole. Overmolding material is applied in a manner which does not fill the mounting hole so that the mounting hole extends through the power control unit. In one embodiment according to the invention, a screw can pass through the PCB mounting hole and into the overmolding mounting hole. A screwdriver can then pass through the PCB mounting hole to turn the screw into the mounting area, through the overmolding mounting hole.

Figure 5:
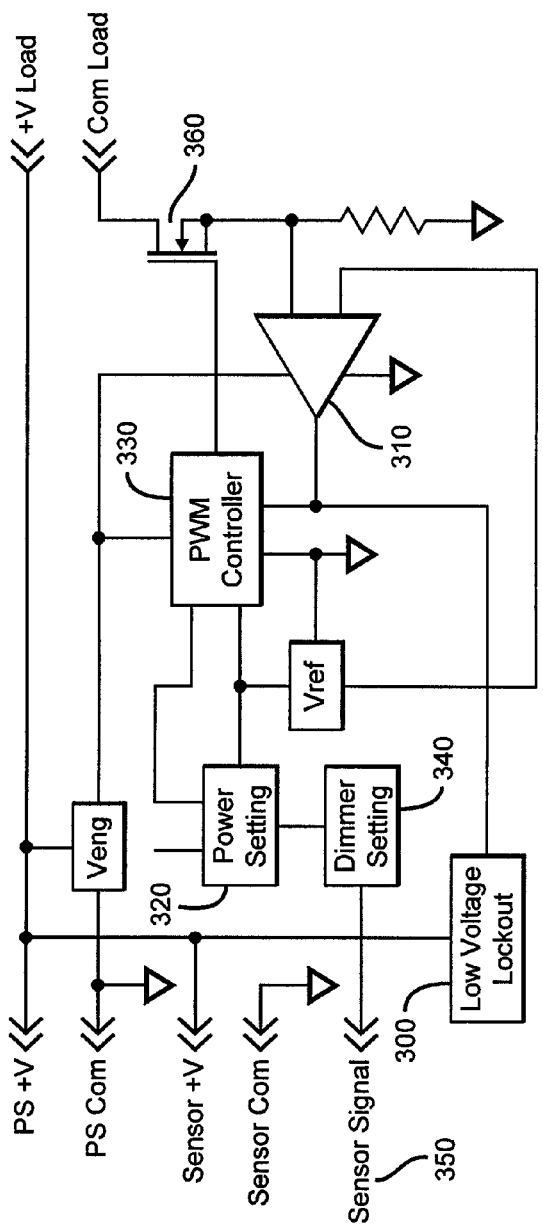
FIG. 5 is a block diagram of the circuitry of a power control and dimmer unit according to an embodiment of the invention.
Figure 6:
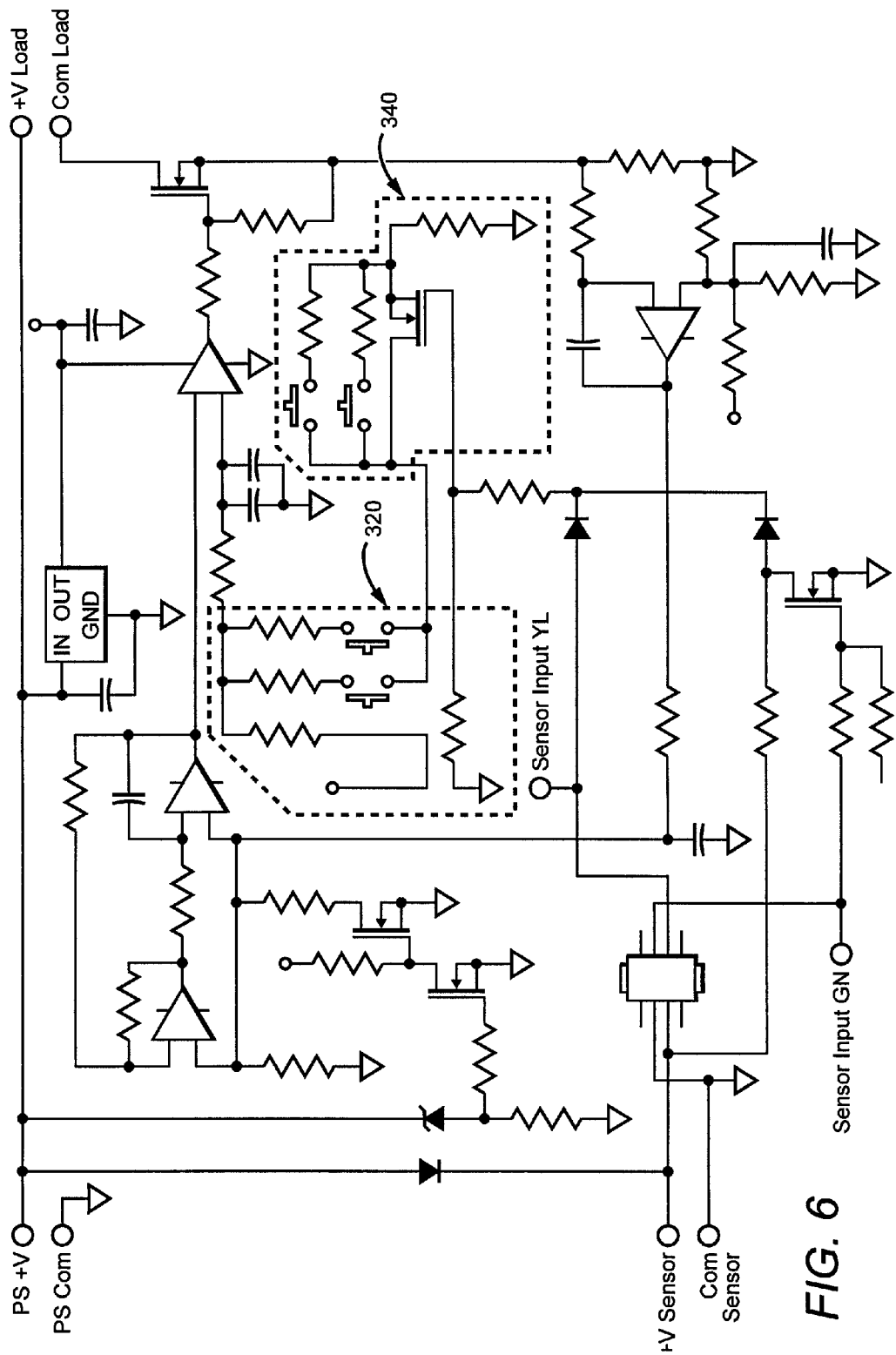
FIG. 6 is a schematic of a power control and dimmer unit according to an embodiment of the invention.

As mentioned above, the power control units according to the present invention can be used in conjunction with many different devices beyond those described above, including but not limited to occupancy sensors and/or dimmers. FIGS. 5 and 6 show another embodiment of the present invention with dimmer functionality that allows the power control unit to dim the output of the light sources. For example, when the power control unit is set to a 96% output the additional dimmer functionality would allow the output to then be dimmed to lower percentage levels of the 96% output, such as 50%, 25% or 12% of the 96% output. These dimmer output reduction values may be adjusted. As shown in FIG. 5, embodiments also including dimmer functionality can further require a dimmer setting circuit 340 and sensor signal 350. An exemplary embodiment of the dimmer setting circuit 340 is shown in FIG. 6, however other circuitry may be used in place of the one shown. The dimmer setting circuit 340 functions such that when an open or low input signal from a sensor or other device is received, the dimmer setting circuit 340 will lower the output duty cycle to a selectable percentage of the power setting. The dim mode percentage is selectable via DIP switches switch 3 and switch 4 and the settings can be adjusted per application. When a high sensor signal 350 is received by the dimmer setting circuit 340 the output duty cycle will increase and return to the selected power setting.

In some embodiments, the device that provides the sensor signal 350 to the dimmer setting circuit 340 can be an occupancy sensor that could be configured to detect the presence of customers in a retail environment so as to efficiently control light intensity and/or power consumption. In yet other embodiments, the device that provides the sensor signal 350 to the dimmer setting circuit 340 can be a remote device to manually adjust the light intensity and/or power consumption from a remote location.

Figure 7:
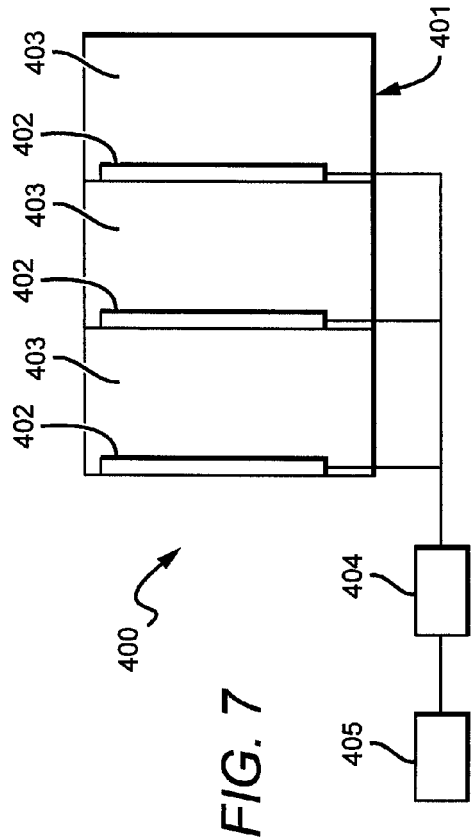
FIG. 7 is a perspective view of a lighting system having a power control unit according to an embodiment of the invention.

FIG. 7 shows one embodiment of a lighting system 400 having a power control unit according to an embodiment of the invention. The lighting system 400 comprises a display unit 401 comprising a display area 403 and one or more light sources 402 to illuminate the display area 403. The lighting system 400 further comprises a power control unit 404 according to the present invention electrically connected to the display unit 401 to control the intensity of the light emitted by the one or more light sources 402, and a power supply 405 electrically connected to the power control unit 404. The lighting system 400 arrangement allows for the display unit 401 light output to be customized to any particular retail environment at different times.

Although the present invention has been described in considerable detail with reference to certain configurations thereof, other versions are possible. Power control units according to the invention can be used for many different applications beyond LED lighting systems. The power control unit can be many different sizes, can be in different types of housings, and can be used in many different configurations. The PCB can have different numbers of electronic components and can have different electronic components arranged in different ways. Therefore, the spirit and scope of the invention and should not be limited to the embodiments described above.

We claim:

1. A power control unit, comprising:
a housing holding internal electronic components;
input and output wiring extending out of said housing and internally connected to said electronic components;
said electronic components further comprising circuitry capable of providing an adjustable output power signal in response to environmental conditions; and
at least one switch configured to cooperate with said electronic components to control a power level of said output power signal, wherein said at least one switch is exposed from said housing;
said circuitry comprising:
a controller which receives at least one input signal and produces said output power signal;
a low voltage lockout circuit configured to monitor an input voltage of said power control unit and prevent operation of said controller if said input voltage is below a predetermined threshold;
a current limit circuit configured to monitor an output load current, said current limit circuit configured to provide a feedback signal to said controller to maintain said output load current below a predetermined current limit threshold; and a power controller setting circuit configured to control said power level of said output power signal, wherein said at least one switch cooperates with said power controller setting circuit to provide a range of power levels selectable by said at least one switch.

2. The power control unit of claim 1 wherein said output power signal comprises a pulse width modulated signal.

3. The power control unit of claim 1 wherein said output power signal comprises a serial binary signal.

4. The power control unit of claim 1 wherein said power controller setting circuit is capable of providing at least 2 power levels of said output power signal.

5. The power control unit of claim 4 wherein said power levels of said output power signal are adjustable.

6. The power control unit of claim 1 wherein said power controller setting circuit is capable of providing at least 4 power levels of said output power signal.

7. The power control unit of claim 6 wherein said at least 4 power levels of power output are 96%, 80%, 60% and 0%.

8. The power control unit of claim 1 wherein said at least one switch comprises at least 2 switches which determine output level.

9. The power control unit of claim 1 further comprising a power supply connected to an input of said power control unit.

10. The power control unit of claim 1 further comprising a dimmer control circuitry adapted to reduce said power level of said output power signal.

11. The power control unit of claim 10 wherein said at least one switch cooperates with said dimmer control circuitry to control said power level of said output power signal.

12. The power control unit of claim 10 said dimmer control circuitry configured to receive a sensor signal, wherein said dimmer control circuitry controls said power level of said output power signal in response to said sensor signal.

13. The power control unit of claim 12 further comprising a sensor adapted to provide said sensor signal to said dimmer control circuitry.

14. The power control unit of claim 13 wherein said sensor comprises an occupancy sensor.

15. The power control unit of claim 1 wherein said power control unit is connected in line with other modules.

16. The power control unit of claim 15 wherein said other modules comprise at least an occupancy sensor.

17. The power control unit of claim 1 wherein said electronic components are on a printed circuit board (PCB).

18. The power control unit of claim 17 wherein said housing further comprises an overmolded portion.

19. The power control unit of claim 18 wherein said PCB is mounted within said overmolded portion.

20. The power control unit of claim 19 wherein an area surrounding the PCB is filled with a sealant.

21. The power control unit of claim 20 wherein said sealant is a thermoplastic hotmelt.

* * * * *